(12) United States Patent
Pöhnlein

(10) Patent No.: US 11,802,559 B2
(45) Date of Patent: Oct. 31, 2023

(54) VANE PUMP

(71) Applicant: ZF Friedrichshafen AG, Friedrichshafen (DE)

(72) Inventor: Florian Pöhnlein, Weildorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 442 days.

(21) Appl. No.: 16/956,184

(22) PCT Filed: Dec. 12, 2018

(86) PCT No.: PCT/EP2018/084456
§ 371 (c)(1),
(2) Date: Jun. 19, 2020

(87) PCT Pub. No.: WO2019/121188
PCT Pub. Date: Jun. 27, 2019

(65) Prior Publication Data
US 2020/0340473 A1    Oct. 29, 2020

(30) Foreign Application Priority Data

Dec. 21, 2017 (DE) .................... 10 2017 223 530.6

(51) Int. Cl.
*F04C 14/06* (2006.01)
*F04C 2/344* (2006.01)
(Continued)

(52) U.S. Cl.
CPC ............ *F04C 14/06* (2013.01); *F04C 2/3442* (2013.01); *F04C 14/24* (2013.01);
(Continued)

(58) Field of Classification Search
CPC ........ F04C 14/06; F04C 14/24; F04C 14/226; F04C 2270/18; F16H 61/0025
See application file for complete search history.

(56) References Cited

U.S. PATENT DOCUMENTS

| | | | |
|---|---|---|---|
| 2012/0275945 A1 | 11/2012 | Schulz-Andres et al. | |
| 2014/0301877 A1* | 10/2014 | Bohm | F04C 11/006 418/269 |
| 2015/0267700 A1 | 9/2015 | Fujita et al. | |

FOREIGN PATENT DOCUMENTS

| | | |
|---|---|---|
| DE | 2630736 B1 | 3/1977 |
| DE | 19546329 A1 | 6/1997 |

(Continued)

OTHER PUBLICATIONS

Borchers, 'Vane Pump with Improved Starting Behavior'—DE102014222322A_MT.pdf (Machine Translation), (2016). (Year: 2016).*

(Continued)

*Primary Examiner* — Kenneth J Hansen
(74) *Attorney, Agent, or Firm* — Dority & Manning, P.A.

(57) ABSTRACT

A vane pump (101) for an automatic transmission includes a suction-side behind-vane pressure duct (112) and a pressure-side behind-vane pressure duct (111). The suction-side behind-vane pressure duct (112) is connected to the pressure side (116) of the vane pump (1). A valve device (113, 114) is connected to the pressure-side behind-vane pressure duct (111). During operation of the vane pump (101), a pressure-side behind-vane pressure (p DH) can be set in the pressure-side behind-vane pressure duct (111) with the valve device (113, 114).

20 Claims, 9 Drawing Sheets

(51) Int. Cl.
 *F04C 14/24* (2006.01)
 *F16H 61/00* (2006.01)
(52) U.S. Cl.
 CPC .... *F16H 61/0025* (2013.01); *F04C 2270/185* (2013.01); *F04C 2270/19* (2013.01); *F04C 2270/701* (2013.01)

(56) References Cited

FOREIGN PATENT DOCUMENTS

| DE | 102013224660 A1 | 6/2015 |
| DE | 102014222322 B3 | 2/2016 |
| WO | WO 2008/092594 A1 | 8/2008 |
| WO | WO 2011042105 A2 | 4/2011 |

OTHER PUBLICATIONS

Ungers, 'Vane Machine with Defined Pressure in the Hindwing Spaces'—DE102013224660A1MT.pdf-DES.pdf (Machine Translation), (2015). (Year: 2015).*

German Search Report DE 10 2017 223 530.6, dated Mar. 17, 2020, (12 pages).

International Search Report (English Translation) PCT/EP2018/084456, dated Mar. 7, 2019, (2 pages).

* cited by examiner

VANE PUMP

CROSS-REFERENCE TO RELATED APPLICATION

The present application is related and has right of priority to WO Publication No. 2019/121188 filed on Dec. 12, 2018 and to German Patent Application No. 10 2017 223 530.6 filed on Dec. 21, 2017, which are both incorporated by reference in their entirety for all purposes.

FIELD OF THE INVENTION

The invention generally relates to a vane pump and to a method for operating this vane pump.

BACKGROUND

The vanes of a vane pump, which are radially movable in the guide slots of the rotor, must be pressed, during operation, by a certain minimum contact pressure with their vane outer side against the cam ring, in order to reliably seal the working chambers formed between the vanes. In principle, the vanes are pressed, during operation, by the centrifugal force radially outward against the cam ring.

In order to ensure the necessary contact pressure also at low speeds—and, therefore, low centrifugal forces onto the vanes—it is known that vane pumps have a so-called behind-vane pressurization. In this case, a behind-vane pressure is applied onto the radially inward-facing side of a vane, which is referred to in the following as the vane inner side, so that the vane is pressed outward against the cam ring. As a result, it is ensured that the vanes rest securely against the cam ring via their vane outer side also at low rotational speeds. This has positive effects on the suction behavior as well as on the volumetric efficiency of the vane pump, in particular in the low rotational speed range. A behind-vane pressurization can be utilized in the case of vane pumps having a variable displacement volume as well as having a fixed displacement volume.

Such a behind-vane pressurization is known from DE 19546329 A1, which describes a double-stroke vane pump having a fixed displacement volume. This double-stroke vane pump includes a control plate and a pressure plate, which delimit the vane pump in the axial direction. Pressure is applied to so-called behind-vane spaces through annular ducts connected to the pressure side of the vane pump, which are designed as circular-ring-sector-shaped cavities in the pressure and control plate concentrically to the axis of rotation of the rotor and within the outer diameter of the rotor. As a result, the vanes are pressed radially outward against the cam ring. The annular ducts are also referred to in the following as behind-vane pressure ducts.

A behind-vane space is the radially internal portion of a guide slot in the rotor of a vane pump, wherein the behind-vane space is delimited radially outward by a vane inner side of the vane. The behind-vane space is axially delimited by the control plate and the pressure plate. The pressure that prevails in the behind-vane spaces is also referred to as behind-vane pressure. The behind-vane pressure acts upon the surface of the vane inner side, as the operative pressure surface, in a radial projection and, as a result, generates a radially outward directed force onto the vanes. In this case, the vane pump includes a suction-side behind-vane pressure duct and a pressure-side behind-vane pressure duct. The suction-side behind-vane pressure duct extends across the angular range of the vane pump, in which the working chambers between the vanes enlarge during a rotation of the rotor, so that the operating medium (usually transmission oil) to be conveyed is sucked in. This angular range is therefore also referred to as the suction region. The vanes move outward in the guide slots, so that the behind-vane spaces enlarge.

The pressure-side behind-vane pressure duct extends across the angular range of the vane pump, in which the working chambers between the vanes become smaller during a rotation of the rotor, so that the conveyed operating medium is displaced. This angular range is also referred to in the following as the displacement region. During a rotation of the rotor through the displacement region, the vanes move radially inward in the guide slots, and so the behind-vane spaces become smaller and the operating medium is displaced from the behind-vane spaces into the pressure-side behind-vane pressure duct.

The suction-side behind-vane pressure duct and the pressure-side behind-vane pressure duct are connected to each other via constrictions. These constrictions operate as hydraulic resistors and can be designed, for example, as throttle points or throttle valves or orifices. Usually, the suction-side behind-vane pressure duct is connected to the pressure side of the vane pump and is therefore acted upon by a pressure, which is referred to in the following as pump pressure.

The mode of operation of this arrangement is as follows. In the displacement region, the pump pressure acts upon the vane outer sides and presses these radially inward, counter to the centrifugal force. In order to hold the vane outer sides securely against the cam ring, the behind-vane pressure in the pressure-side behind-vane pressure duct must be greater than the pump pressure that prevails in the displacement region in the working chambers of the vane pump. This can be achieved with the aid of the arrangement, described in the following, of the hydraulic resistances between the suction-side behind-vane pressure duct and the pressure-side behind-vane pressure duct as well as the connection of the suction-side behind-vane pressure duct to the pressure side of the vane pump. During the turning motion of the rotor of the vane pump, the vanes are pressed, as described, against the cam ring via the vane outer side due to the centrifugal force and the behind-vane pressure and glide along the cam ring, and so the vanes necessarily carry out a reciprocating motion in the slot throughout one revolution. The pump pressure acts, via a hydraulic connection, in the suction-side behind-vane pressure duct and, via a constriction, also in the pressure-side behind-vane pressure duct. In the suction-side behind-vane pressure duct, the suction-side behind-vane pressure corresponding to the pump pressure reliably presses the vanes against the cam ring, so that a reliable suctioning of the vane pump is ensured. If the behind-vane spaces reach the end of the suction region or the end of the suction-side behind-vane pressure duct, the volume of the particular behind-vane space is the maximum due to the travel of the particular vane and is acted upon by the pump pressure.

During the further rotor rotation through the now adjoining displacement region, the vanes are pushed radially inward, so that the volume of the particular behind-vane space is reduced and the operating medium is displaced from the behind-vane space as described above. Therefore, the operating medium in the behind-vane spaces is conveyed from the suction region to the pressure or displacement region. The relative forces on a vane are as follows. The centrifugal force occurring during a rotation of the rotor and the force from the behind-vane pressure, which acts upon the vane inner side, act radially outward. Counteracting this is the force from the pump pressure, which acts upon the vane outer side. Since the centrifugal force decreases with the rotational speed, the pressure-side behind-vane pressure must be greater than the pump pressure.

Due to the hydraulic resistances, the operating medium displaced from the behind-vane spaces can now flow, not unobstructed, from the pressure-side behind-vane pressure duct to the suction-side behind-vane pressure duct. As a result, the behind-vane pressure in the pressure-side behind-vane pressure duct increases beyond the pump pressure, so that the vane outer sides reliably rest against the cam ring in the pressure region as well. If the pressure-side behind-vane pressure duct would be directly connected to the pressure region of the vane pump, only the pump pressure would prevail in the behind-vane pressure duct, whereby the pressures on the vane outer side and the vane inner side would be equal and the vane outer sides in the displacement region would not unambiguously rest against the cam ring.

The level of the hydraulic resistance (restrictor or orifice) is determined, for example, on the basis of the flow cross-section or on the basis of a resistance coefficient or on the basis of a pressure differential between the pressure upstream from and downstream from the hydraulic resistance. This pressure differential is also referred to in the following as pressure loss. Due to the behind-vane pressure increasing with the hydraulic resistance, the vane outer sides are pressed counter to the pump pressure in the working chambers of the vane pump against the cam ring, and so these achieve an appropriate sealing effect. As a result, frictional forces naturally arise between the cam ring and the vane outer side, which generate a torque loss and, therefore, a power loss, but are unavoidable for the reliable function of the vane pump.

With respect to the configuration of the hydraulic resistance, the hydraulic resistance is selected in such a way that the pressure-side behind-vane pressure at a certain rotational speed suffices, on the one hand, for securely sealing the working chambers and, on the other hand, does not considerably exceed this value, and so the frictional forces arising due to the contract pressure of the vanes are held within limits. The certain rotational speed is preferably in the lower rotational speed range in this case, since the centrifugal forces are lowest here.

As the rotational speed increases, the flow conveyed through the behind-vane spaces increases and, therefore (according to the equation for a flow through a hydraulic resistance), the behind-vane pressure in the pressure-side behind-vane pressure duct increases. As a result, the radial force between the vane outer side and the cam ring exceeds the force necessary for the secure seal, whereby, disadvantageously, the power loss increases and the efficiency of the pump deteriorates. Further possible undesirable effects due to an excessive contact pressure and/or an excessive behind-vane pressure are wear on the cam ring and the vane outer side as well as noise.

An increasing viscosity of the operating medium at low temperatures also results in an undesirable increase of the behind-vane pressure. As the viscosity of the oil increases, so does the hydraulic resistance and/or the pressure loss at the throttle point. As a result, a higher pressure arises in the pressure-side behind-vane pressure duct than is the case at a normal operating temperature, whereby the contact force of the vane onto the cam ring and the drive torque of the vane pump increase and adversely affect efficiency and service life in a disadvantageous way.

SUMMARY OF THE INVENTION

Example aspects of the present invention provide a vane pump, in the case of which a reliable seal prevails between the vanes and the cam ring across preferably all operating ranges, without worsening the overall efficiency and the wear behavior of the vane pump. In particular, the pressure-side behind-vane pressure should be limited below a reliable maximum value, in order to reduce these negative effects on efficiency and wear behavior.

In example embodiments, this object is achieved due to the fact that a vane pump for an automatic transmission includes a suction-side behind-vane pressure duct and a pressure-side behind-vane pressure duct. The suction-side behind-vane pressure duct is connected to the pressure side of the vane pump, so that the pump pressure prevails therein. According to example aspects of the invention, the vane pump includes a valve unit, to which the pressure-side behind-vane pressure duct is connected, wherein, during operation of the vane pump, the level of a pressure-side behind-vane pressure in the pressure-side behind-vane pressure duct is adjustable with the aid of the valve unit.

The term "adjustable" is to be understood to mean, in this context, that the pressure-side behind-vane pressure can be set at a constant or variable value with the aid of the valve unit.

In one preferred example embodiment of the invention, the valve unit is arranged between the pressure-side behind-vane pressure duct and the suction-side behind-vane pressure duct, so that the pressure-side behind-vane pressure duct can be connected to the suction-side behind-vane pressure duct with the aid of the valve unit. As a result, the valve unit can be arranged with the least amount of required installation space. It is also possible to lower the pressure-side behind-vane pressure to the level of the pump pressure by reducing the hydraulic resistance of the valve unit to zero. The pressure-side behind-vane pressure then corresponds to the suction-side behind-vane pressure and, therefore, to the pump pressure.

The hydraulic resistance of the valve unit is understood to mean the pressure losses during the through-flow of the valve unit in an example embodiment as a throttle valve or as an orifice, and as an opening pressure in an example embodiment as a pressure limiting valve.

It is also possible that the suction-side behind-vane pressure duct is connectable, via a valve unit, not only to the suction-side behind-vane pressure duct but also to another region of the hydraulic system, such as a non-pressurized region. As a result, it is possible, for example, to reduce the pressure-side behind-vane pressure to zero, due to the fact that the pressure-side behind-vane pressure duct is connected to the non-pressurized region if the centrifugal force of the vanes suffices, without an additional hydraulic pressure, to press the vane ends, counter to the pump pressure, against the cam ring and, thereby, to ensure a reliable function of the vane pump.

In one further example embodiment, the pressure-side behind-vane pressure duct can be connected, via a valve unit having a variable resistance, to the pressure port or to the pressure side of the vane pump.

In addition, several valve units can be arranged between various regions of the pressure-side behind-vane pressure duct and the suction-side behind-vane pressure duct, so that more flow cross-section is available and the pressure-side behind-vane pressure can be changed faster.

It can also be provided that the valve unit is arranged between the pressure-side behind-vane pressure duct and a region of the suction side of the vane pump.

Advantageously, the valve unit has a variable hydraulic resistance. Due to the change of the resistance, the flow flowing through the valve unit from the pressure-side behind-vane pressure duct to the suction-side behind-vane pressure duct and, therefore, the pressure-side behind-vane pressure, can be changed.

Preferably, the valve unit is designed as an adjustable throttle valve or as an adjustable orifice.

Alternatively, the valve unit is designed as an adjustable orifice.

As a further alternative, the valve unit is designed as a pressure limiting valve, through which flow can take place from the pressure-side behind-vane pressure duct to the suction-side behind-vane pressure duct.

If multiple valve units should be arranged in the vane pump, these can be identically or differently designed, as restrictors, orifices, or pressure limiting valves.

In one preferred example embodiment of the invention, it is provided that the hydraulic resistance of the valve unit is adjustable with the aid of an electronic transmission control unit depending on one or multiple operating variables. The operating variables, which are detected in the electronic transmission control unit, are physical values, which indicate the operating condition of the vane pump, such as the temperature of the operating medium, the pump speed, or the pressure in the pressure-side behind-vane pressure duct.

Currents of the electronic transmission control unit can also be detected, which indicate a pump pressure generated by the pump.

It is possible that the vane pump includes a sensor unit, which detects the pressure-side behind-vane pressure.

Advantageously, the change of the pressure-side behind-vane pressure takes place depending on different operating parameters, which are detected in the electronic transmission control unit.

In addition, it is possible that the pressure-side behind-vane pressure is reduced after a start signal of the vane pump after a certain time period has lapsed. This time period, after the lapse of which it is known that the pressure-side behind-vane pressure no longer must be raised to a maximum value and can now be lowered, can be experimentally determined in advance.

It can also be provided that the hydraulic resistance of the valve unit is adjustable with the aid of an actuator.

In a further alternative or additionally usable example embodiment of the invention, the valve unit is designed as an automatically, temperature-dependently variable restrictor or orifice, wherein the hydraulic resistance thereof is greater at low temperatures than at higher temperatures, so that the pressure-side behind-vane pressure is greater at lower temperatures than at higher temperatures. The automatically, temperature-dependently variable restrictor or orifice can have its effect due to the utilization of a memory metal or a bimetal. The advantage of this example embodiment is an increase of the pressure-side behind-vane pressure for the critical cold start phase, in which it must be ensured that the vanes securely rest against the cam ring.

In a preferred example embodiment of the vane pump, axially and/or radially directed ducts are formed in an axial plate of the vane pump, which connect the pressure- and suction-side behind-vane pressure ducts to the valve unit.

One advantageous example embodiment provides that the pressure-side behind-vane pressure duct and the suction-side behind-vane pressure duct are hydraulically connected to each other, wherein a hydraulic resistance is formed between the pressure-side behind-vane pressure duct and the suction-side behind-vane pressure duct. In addition, a pressure limiting valve is arranged between the pressure-side behind-vane pressure duct and the pressure duct or the pressure side of the vane pump. The pressure limiting valve is arranged in such a way, in this case, that flow therethrough can take place from the pressure-side behind-vane pressure duct, so that the pressure-side behind-vane pressure can be limited with the aid of the pressure limiting valve. Alternatively, the pressure-side behind-vane pressure duct can be connectable via the pressure limiting valve to a suction duct of the vane pump or to a non-pressurized region of the automatic transmission.

Preferably, the hydraulic resistance can be designed as a restrictor or as an orifice.

It is possible that the vane pump is designed as a single-flow (or also referred to as single-stroke) or multi-flow (also referred to as multi-stroke) vane pump. In the case of a single-stroke vane pump, the rotor is arranged eccentrically with respect to a circular cam ring, so that the vanes implement one complete stroke through one revolution of the rotor, i.e., the vanes are located at their radial innermost position one time and at their radially outermost position one time per revolution. In the case of a two-stroke vane pump, the vanes are located at their radial innermost position two times and at their radially outermost position two times during one revolution of the rotor. Since a single-stroke vane pump includes only one suction connection and one pressure connection, this is also referred to as single-flow. A two-stroke vane pump, however, includes two self-sufficient delivery units, which, theoretically, can supply two separate consumers with different pressures or flow rates. A two-stroke vane pump therefore also includes two suction and pressure connections, which is why this is also referred to as a double-flow vane pump.

A single-stroke vane pump generally includes only one suction-side behind-vane pressure duct and one pressure-side behind-vane pressure duct. A two-stroke vane pump generally includes two pressure-side and two suction-side behind-vane pressure ducts, which are respectively connected to each other by valve units as described above.

A method is provided for operating an above-described vane pump, in which an actual value of the pressure-side behind-vane pressure and certain operating parameters are detected and the actual value is compared to a specified value of the behind-vane pressure associated with the operating parameters, wherein, in the case of a deviation of the actual value from the specified value, the pressure-side behind-vane pressure is adapted to the specified value by changing the hydraulic resistance of the valve unit.

In so doing, it is provided that the actual value of the pressure-side behind-vane pressure is measured by a pressure sensor.

Alternatively, a method is provided for operating a vane pump, in which an actual value of at least one certain operating parameter is detected, which indirectly indicates the level of the pressure-side behind-vane pressure, after which this actual value is compared to a specified value associated with the operating parameters, wherein, in the case of a deviation of the actual value from the specified value, the pressure-side behind-vane pressure is adapted to the specified value by changing the hydraulic resistance of the valve unit until the actual value of the certain operating parameter matches its specified value.

A detected operating parameter can be the temperature of the pump or of the operating medium in this case, since, as a result, inferences can be drawn regarding whether a cold start is present, in which case a sufficient contract pressure of the vanes in the pressure region of the vane pump is to be ensured.

As a further alternative, during a cold start, the pressure-side behind-vane pressure can remain elevated for a certain time period and, after this time period, which has a duration determined via experimentation, can be lowered, so that the cold intake during a cold start is ensured and, thereafter, the friction of the vanes does not remain at an excessively high level to the detriment of the efficiency.

In one preferred example embodiment, it is provided that the vane pump includes a valve unit, with the aid of which, at least in a first operating condition, at least one behind-vane pressure duct can be hydraulically disconnected from the pressure region of the pump and at least one behind-vane pressure duct can be connected to a non-pressurized region, and, in a second operating condition, at least one behind-vane pressure duct can be connected to the pressure region of the vane pump.

It is also possible that the vane pump is designed to be at least two-stroke and, therefore, includes at least two pressure-side behind-vane pressure ducts and at least two suction-side behind-vane pressure ducts. The aforementioned example embodiments are then formed in each self-sufficient portion of a multi-stroke vane pump between suction-side and pressure-side regions. Suction-side and pressure-side regions encompass behind-vane pressure ducts, pressure ports and suction ports, as well as suction lines and pressure lines.

For a vane pump designed in such a way, a method is provided, in which, in a lower rotational speed range during or after the start of the vane pump, initially the pressure-side behind-vane pressure is raised with the aid of the valve unit while the suction-side behind-vane pressure duct is connected to the pressure side of the vane pump and the pressure-side behind-vane pressure duct is disconnected from a non-pressurized region. Once a second rotational speed or pressure value has been reached, the hydraulic resistance of the valve unit between the behind-vane pressure ducts is reduced, so that the pressure-side behind-vane pressure decreases. During a further rotational speed increase, once a third, highest rotational speed value has been reached, the behind-vane pressure ducts are disconnected from the pressure side of the vane pump and are connected to a non-pressurized region.

Additionally, in this method, in addition to the rotational speed of the vane pump, an operating temperature of the vane pump can also be detected in the electronic transmission control unit and, during a start of the vane pump at an operating temperature below a certain temperature, the resistance of the valve unit can be initially increased in such a way that the pressure-side behind-vane pressure increases above a certain pressure value, which has been selected to be sufficiently high in order to press the vane ends against the cam ring. As the rotational speed increases, the pressure-side behind-vane pressure is reduced with the aid of the valve unit.

Advantageously, an above-described vane pump is arranged in an automatic transmission for a motor vehicle.

BRIEF DESCRIPTION OF THE DRAWINGS

Exemplary embodiments of the vane pump according to the invention are represented in the drawings and are described in greater detail in the following.

Wherein.

DETAILED DESCRIPTION

Figure 1:
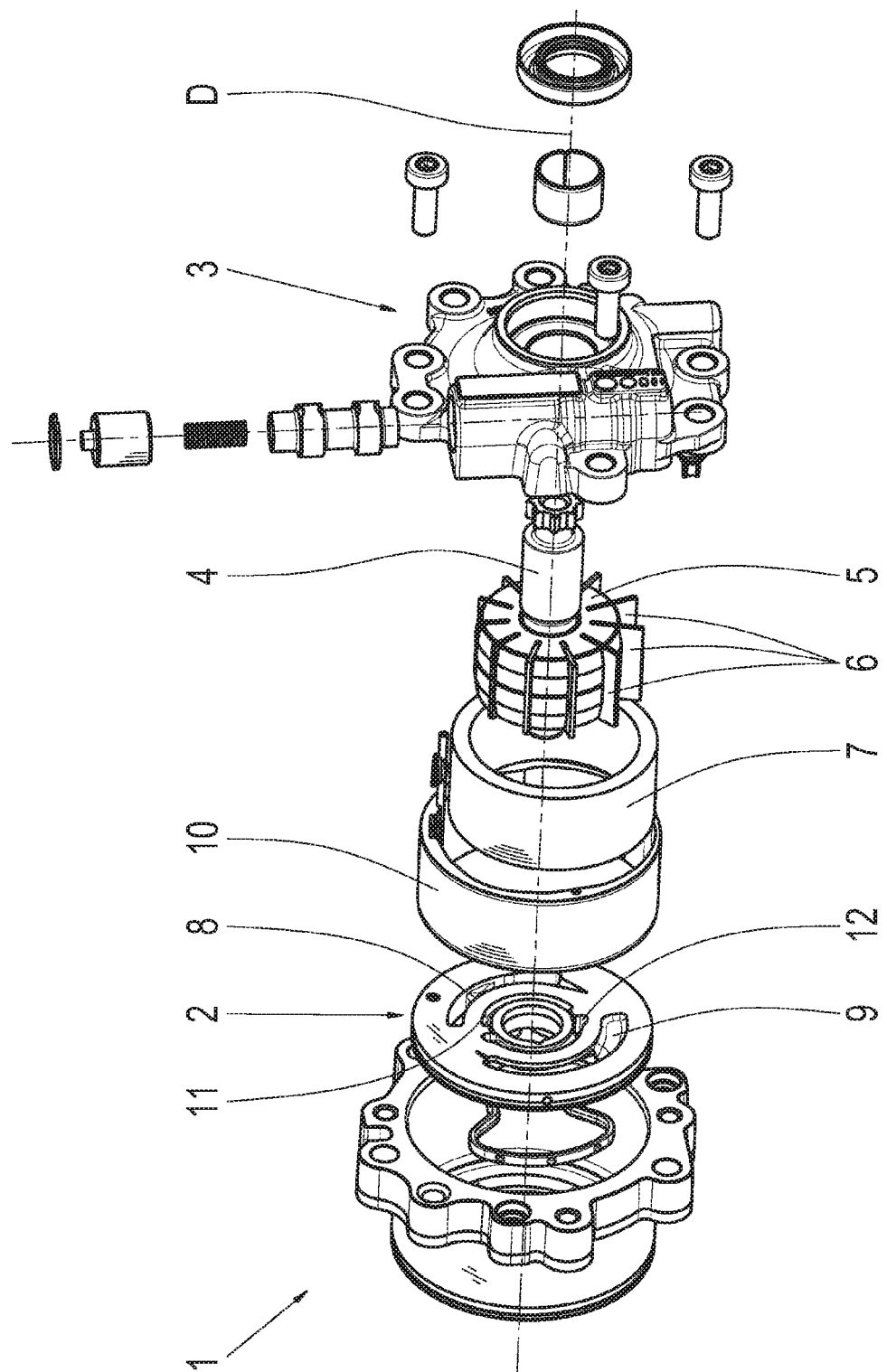
FIG. 1 shows a vane pump according to the prior art.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vane pump 1 according to the prior art in an exploded representation. The vane pump 1 includes a rotor 5 with vanes 6, which are radially displaceable in the rotor 5. The radial movement of the vanes 6 is limited by a cam ring 7. The cam ring 7 is swivelably arranged within a likewise ring-shaped housing 8, in order to adjust the displacement volume of the vane pump 1. In the axial direction, i.e., along the direction of an axis of rotation D of a pump shaft 4, the vane pump 1 is limited by a first axial plate and a second axial plate, wherein the first axial plate is referred to as a pressure plate 2 and the second axial plate is referred to as a cover plate 3. In the front faces of the pressure plate 2 and of the cover plate 3, each of which axially faces the rotor 5, a pressure port and a suction port, as well as a suction-side behind-vane pressure duct and a pressure-side behind-vane pressure duct are formed as cavities. In the perspective representation from FIG. 1, only one pressure port 8, one suction port 9, one pressure-side behind-vane pressure duct 11, and one suction-side behind-vane pressure duct 12 of the pressure plate 2 are shown, for the sake of clarity. The representation of the corresponding ducts in the cover plate 3 is not necessary for the understanding of the invention. The suction port 9 and the suction-side behind-vane pressure duct 12 as well as the pressure port 8 and the pressure-side behind-vane pressure duct 11 are two concentric arcs of a circle in each case.

The vane pump shown in FIG. 1 is designed to be single-stroke. In the case of a double-stroke or multi-stroke vane pump as well, throttle points can be formed between the pressure-side behind-vane pressure duct and the suction-side behind-vane pressure duct.

Figure 2:
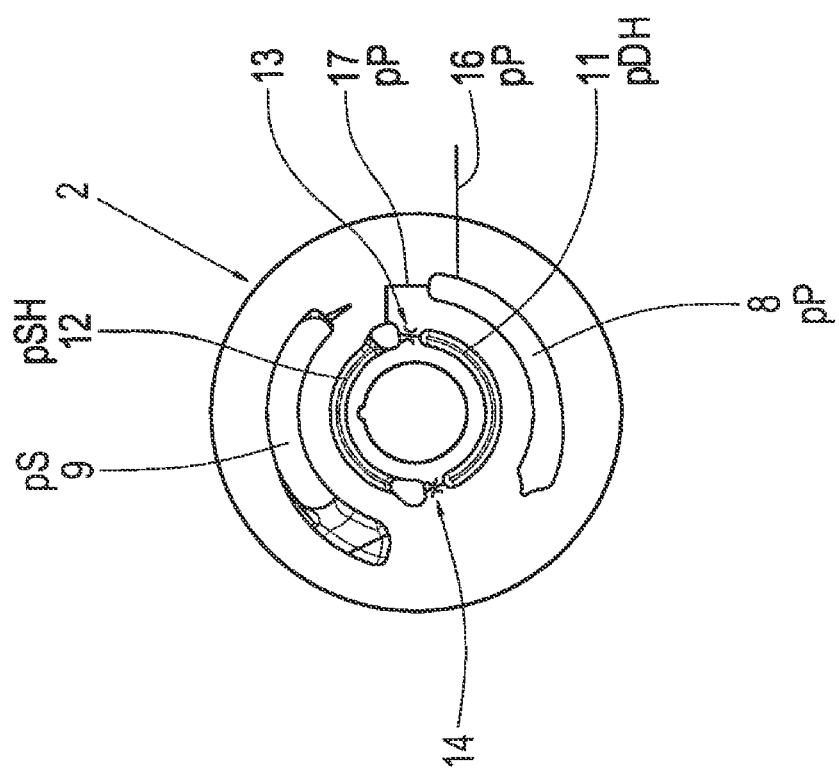
FIG. 2 shows a pressure plate of a vane pump according to the prior art.

FIG. 2 shows a diagrammatic axial view of the pressure plate 2 according to the prior art, including the suction-side behind-vane pressure duct 12, which was already shown in FIG. 1, and the pressure-side behind-vane pressure duct 11, and the suction port 9 and the pressure port 8. The pressure prevailing in the suction-side behind-vane pressure duct 12 is referred to in the following as the suction-side behind-vane pressure pSH and the pressure prevailing in the pressure-side behind-vane pressure duct 11 is referred to as the pressure-side behind-vane pressure pDH. The pressure port 8 is connected via a pressure line 16 to the pressure side of the vane pump 1, in which a pump pressure pP prevails. The suction-side behind-vane pressure duct 12 is connected via a line 17 to the pressure port 8 and, therefore, is acted upon by the pump pressure pP generated by the vane pump 1. The pressure side (or also the pressure region) of a pump is the side at which the operating medium is delivered by the pump and at which a pressure is generated by the pump. The opposite side of the pressure side is the suction side, by which the operating medium is sucked in by the pump, or by which the operating medium is moved toward the pump under the effect of the atmospheric or atmospheric pressure as soon as a volume expands due to the movement of the pump, whereby the pressure in this space drops below the ambient pressure.

The pressure-side behind-vane pressure duct 11 and the suction-side behind-vane pressure duct 12 are connected to each other at their two ends by a throttle point 13 and 14, respectively. The throttle points 13 and 14 are also referred to as throttle valves. The throttle points 13 and 14 are hydraulic resistances or constrictions. These are utilized, as described above, in such a way that, during a displacement of the operating medium, generally transmission oil, during the radial retraction movement of the vanes 6 during movement over the pressure port, the pressure-side behind-vane pressure pDH increases, since, due to the pressure losses and/or the flow resistances in the throttle points 13 and 14, the oil cannot be displaced fast enough out of the pressure-side behind-vane pressure duct 11 into the suction-side behind-vane pressure duct 12. This has disadvantages, however, as described above, since, due to the resistances of the throttle valves 13 and 14, the pressure-side behind-vane pressure pDH increases beyond a reasonable extent during a higher speed and, therefore, a higher displacement speed of the operating medium.

Figure 3:
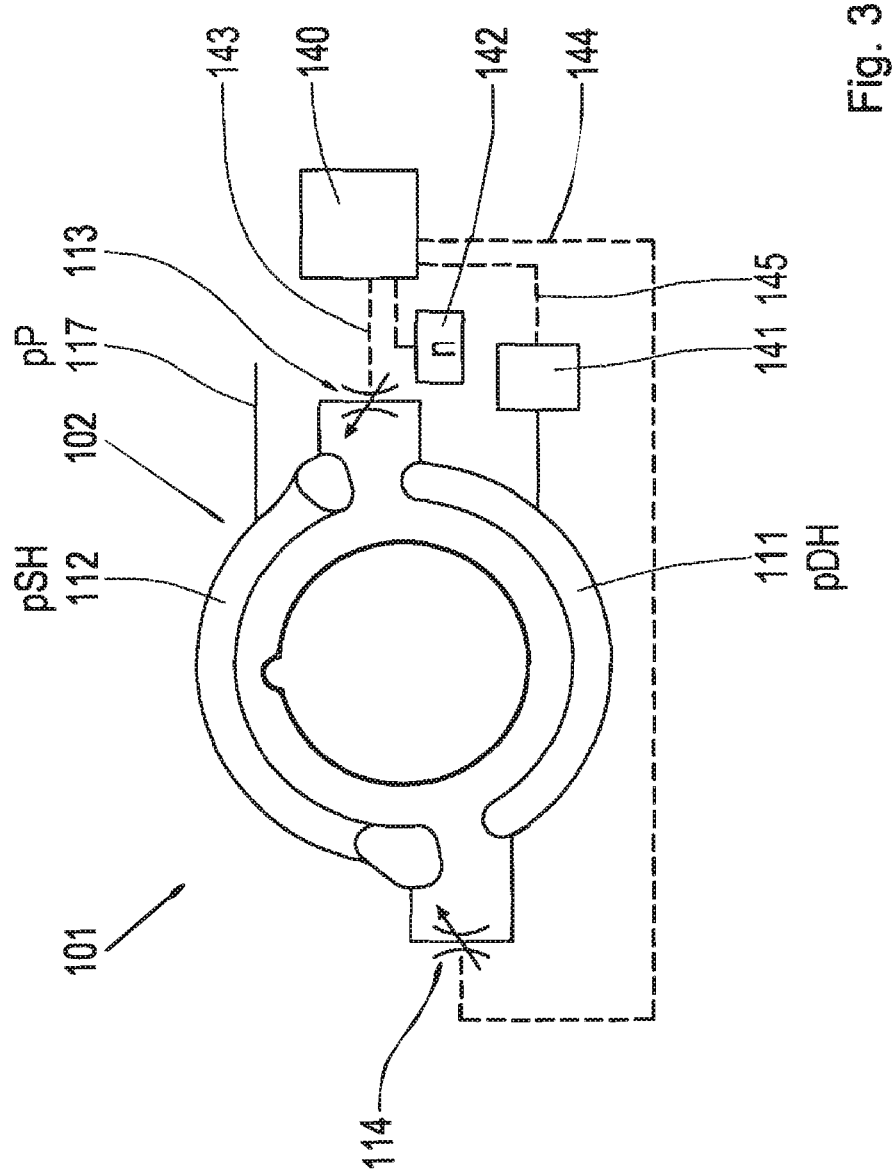
FIG. 3 shows an enlarged section of the pressure plate of the vane pump according to the invention in a first example embodiment.

FIG. 3 shows an enlarged section of a diagrammatic axial view of a pressure plate 102 of a vane pump 101 according to example aspects of the invention, in which only one suction-side behind-vane pressure duct 112 and one pressure-side behind-vane pressure duct 111 are represented. A valve unit, which is designed as an adjustable throttle valve 113 and 114, is arranged between the end of the pressure-side behind-vane pressure duct 111 and the end of suction-side behind-vane pressure duct 112, at each end thereof. With respect to the adjustable throttle valves 113 and 114, it is possible to change the hydraulic resistance due to the fact that, for example, the cross-sectional area, through which flow can occur from the pressure-side behind-vane pressure duct 111 to the suction-side behind-vane pressure duct 112, can be changed, or the shape can be changed in such a way that a loss coefficient changes, which, according to the laws of fluid dynamics, influences the pressure differential arising during a through-flow having a certain flow rate, i.e., the pressure loss across the restrictor. Due to the reduction of the hydraulic resistance, it is therefore possible to lower the pressure-side behind-vane pressure pDH. Types of construction for such a throttle valve 113 or 114 can be, for example, needle nozzles. Alternatively, the valve unit could also be designed as an orifice instead of as a restrictor. An orifice is shorter, relative to diameter, than a restrictor and theoretically viscosity-independent with regard to the pressure losses.

For this purpose, the pressure-side behind-vane pressure pDH can be measured, for example, with the aid of a pressure sensor 141, which transmits the measured value via a signal line 145 to an electronic transmission control unit 140. In the electronic transmission control unit 140, a specified-actual value comparison is carried out and the resistance in the valve unit 113 or 114 is changed or reduced for as long as it takes for the specified value of the pressure-side behind-vane pressure pDH to be reached. The adjustable throttle valves 113 and 114 are actuated by the electronic transmission control unit 140 via signal lines 143 and 144, respectively. Theoretically, it would also be possible to provide only one valve unit between the behind-vane pressure ducts, although the maximum available flow cross-section would then be limited.

Alternatively or in addition to the measurement of the pressure-side behind-vane pressure pDH, an indication of the force ratios on the vanes or on the cam ring can be obtained by measuring a pump speed n, since the contact pressures increase as the rotational speed n increases and, thereby, the pressure-side behind-vane pressure pDH can be lowered. In addition, on the basis of an operating temperature T_Öl or a corresponding component temperature, it can be detected whether the vane pump is in a cold start phase, in which it is necessary for the vane ends to rest securely against the cam ring in order to suction the operating medium into the vane pump. During this cold start phase, the pressure-side behind-vane pressure pDH must be slightly greater than in the case of a subsequently reached higher rotational speed n and, therefore, greater centrifugal forces of the vanes onto the cam ring.

An enlargement of the flow cross-section of the throttle valve has a great effect on the level of the pressure-side behind-vane pressure pDH. For example, this is reduced by approximately 50% when the cross-sectional area of the restrictor is enlarged by 166%. The maximum pressure difference in tests was p=50 bar.

Theoretically, starting at a certain speed, the pressure-side behind-vane pressure duct as well as the suction-side behind-vane pressure duct can be closed toward the rest of the hydraulic system and connected to a non-pressurized region with the aid of a valve unit.

Figure 4:
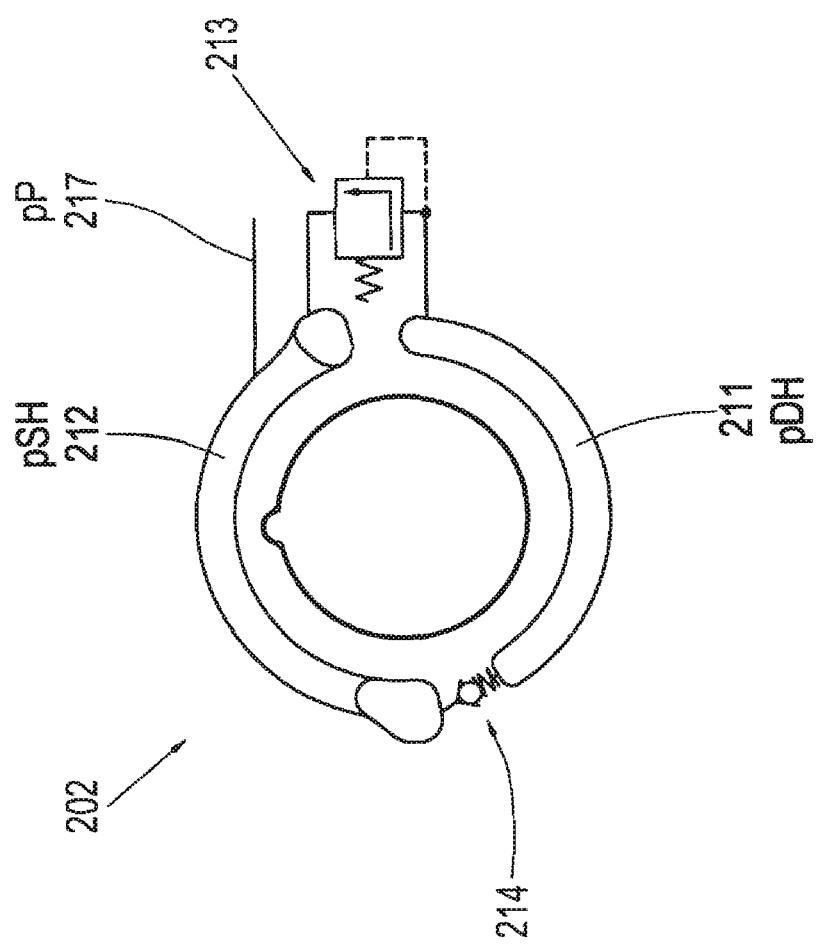
FIG. 4 shows an enlarged section of the pressure plate of the vane pump according to the invention in a second example embodiment.

FIG. 4 shows a diagrammatic enlarged section of a pressure plate 202 as a second embodiment of a vane pump according to example aspects of the invention. In this case, a valve unit designed as a pressure limiting valve 213 is arranged between a pressure-side behind-vane pressure duct 211 and a suction-side behind-vane pressure duct 212. For the sake of the simplified representation, only one pressure limiting valve is shown; in principle, a further pressure limiting valve can be arranged between the two other ends of the behind-vane pressure ducts, which would increase the flow cross-section in an advantageous way. The pressure limiting valve 213 is designed with respect to its opening pressure in such a way that the pressure limiting valve 213 is opened by the pressure-side behind-vane pressure pDH when the pressure-side behind-vane pressure pDH exceeds a reliable value. The flow resistance of the pressure limiting valve 213 is therefore the opening pressure of the pressure limiting valve 213. The pressure-side behind-vane pressure pDH is therefore limited to a certain maximum value. Additionally, a check valve 214 is arranged between the pressure-side behind-vane pressure duct 211 and the suction-side behind-vane pressure duct 212 in such a way that the pressure-side behind-vane pressure duct 211 can be filled from the suction-side behind-vane pressure duct 212. Alternatively, an orifice or a restrictor can also be provided instead of the check valve, although with a worse effect with respect to the function.

Figure 5:
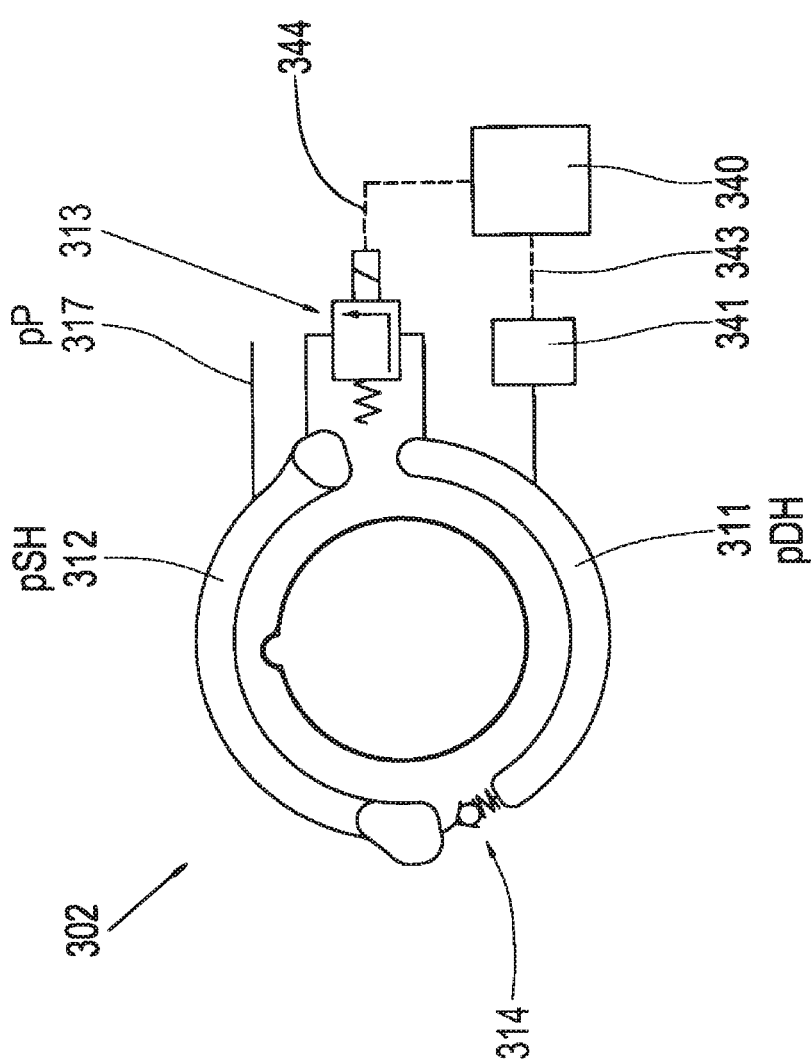
FIG. 5 shows an enlarged section of the pressure plate of the vane pump according to the invention in a third example embodiment.

FIG. 5 shows a third example embodiment of a vane pump in a diagrammatic enlarged section of a pressure plate 302. This vane pump includes a pressure-side behind-vane pressure duct 311 and a suction-side behind-vane pressure duct 312, between which an electrically actuatable pressure control valve 313 is arranged, at at least one point. The pressure-side behind-vane pressure pDH is measured with the aid of a pressure sensor 341 and is transmitted to an electronic transmission control unit 340 via a signal line 343. After a specified-actual value comparison in the electronic transmission control unit 340, the pressure control valve 313 is actuated by the electronic transmission control unit 340 via a signal line 344 and, thereby, the pressure-side behind-vane pressure pDH in the pressure-side behind-vane pressure duct 311 is set to the desired value. Additionally, a check valve 314 is arranged between the pressure-side behind-vane pressure duct 311 and the suction-side behind-vane pressure duct 312 in such a way that the pressure-side behind-vane pressure duct 311 can be filled from the suction-side behind-vane pressure duct 312. The opposite direction is blocked. Alternatively, an orifice or a restrictor can also be provided instead of the check valve, although with a worse effect with respect to the function.

In principle, the valve units can be arranged on the side of only one axial plate or both axial plates; for reasons related to cost and installation space, however, only a one-sided embodiment is to be preferred, provided the implementable flow cross-sections are sufficient.

Figure 6:
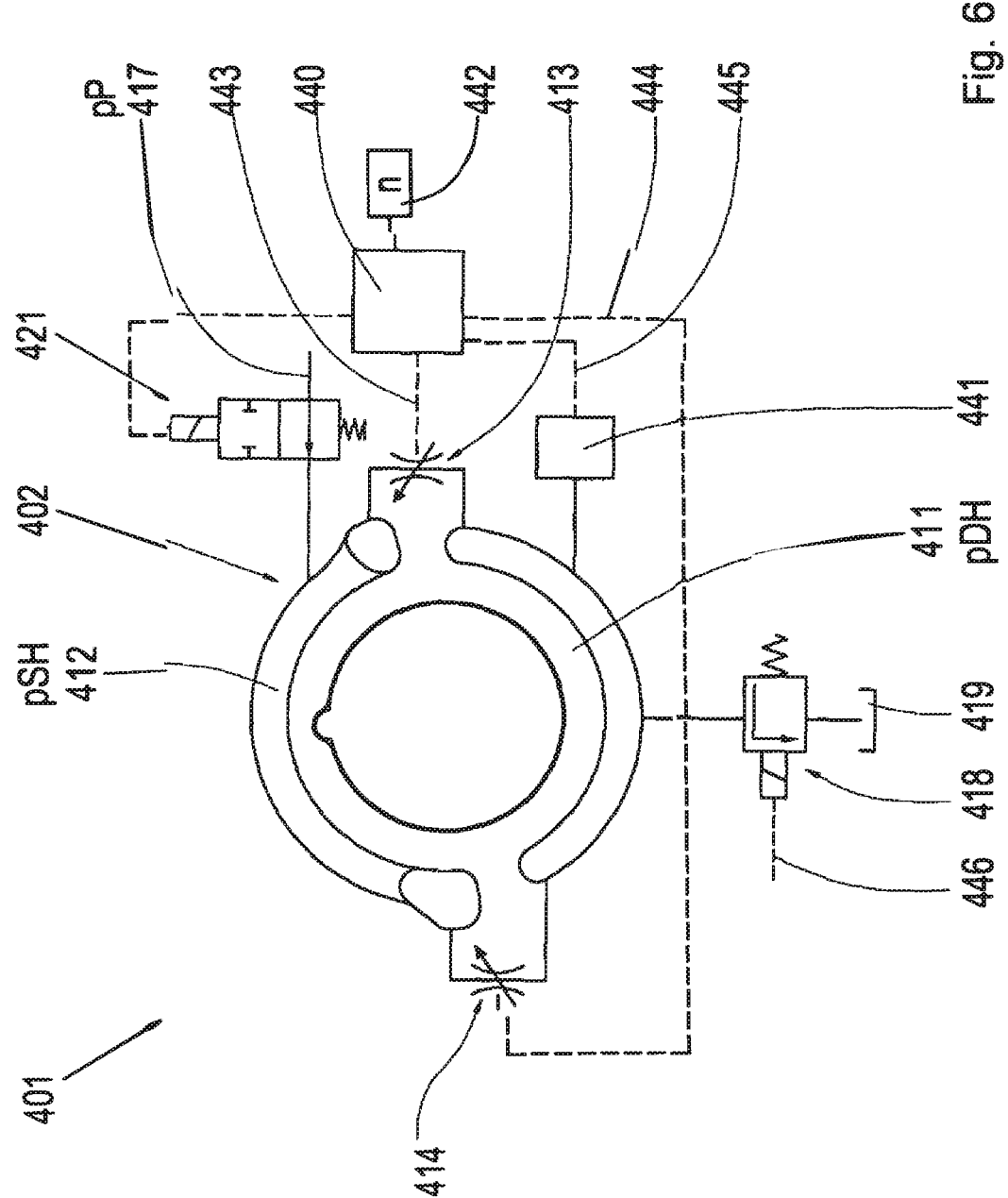
FIG. 6 shows an enlarged section of the pressure plate of a vane pump according to the invention in a fourth example embodiment.

FIG. 6 shows an enlarged section of a pressure plate 402 as the fourth embodiment of a vane pump 401 according to example aspects of the invention, which corresponds to the embodiment from FIG. 3 with respect to basic design. Additionally, the vane pump 401 includes an electrically actuatable pressure control valve 418, which is operative as a bleed valve and with the aid of which the pressure-side behind-vane pressure pDH can be lowered to theoretical ambient pressure, due to the fact that the pressure-side behind-vane pressure duct 411 is connected to a non-pressurized region 419. A shut-off valve 421 designed as a directional valve is arranged in the inflow to the suction-side behind-vane pressure duct 412, with the aid of which the suction-side behind-vane pressure duct 412 can be disconnected from the pressure side 417 of the vane pump 401. The pressure-side behind-vane pressure pDH is measured with the aid of a pressure sensor 441 and is transmitted to an electronic transmission control unit 440 via a signal line 445. The electronic transmission control unit 440 also actuates, via signal lines 443 and 444, the adjustable throttle valves 413 and 414, respectively, between the pressure-side behind-vane pressure duct 411 and the suction-side behind-vane pressure duct 412. The rotational speed n of the vane pump 401, which can be measured, for example, by a speed sensor 442, is detected in the electronic transmission control unit 440. The operating temperature T_Öl can also be measured with the aid of a sensor.

Figure 7:
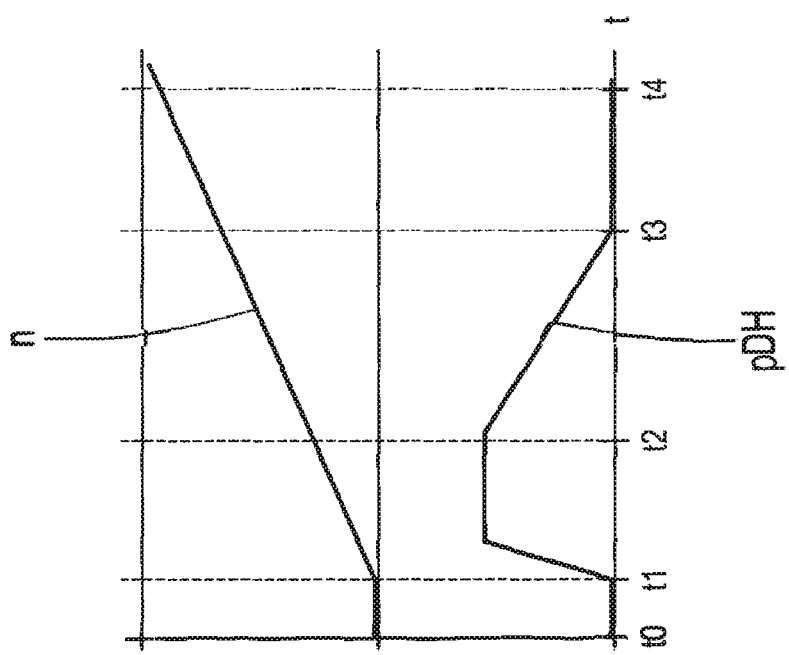
FIG. 7 shows a timing diagram of a method for operating the fourth example embodiment of the vane pump.

The purpose of these components, which are in addition to the example embodiment from FIG. 3, becomes apparent from the method, which is represented on the basis of a timing diagram in FIG. 7. In a lower speed range, which begins in the time profile starting at a point in time t1, the shut-off valve 421 is opened and the pressure control valve 418 is closed. The system functions as described with reference to FIG. 3, so that the pressure-side behind-vane pressure pDH is sufficiently high during the starting operation. The pressure-side behind-vane pressure pDH can be held constant, for example, as represented up to a point in time t2. As the rotational speed n increases, which is detected by a speed sensor 442, the pressure-side behind-vane pressure pDH is lowered starting at a point in time t2 with the aid of the reduction of the flow resistances of the adjustable throttle valves 413 and 414, since, due to the increasing centrifugal force on the vanes, the sum of centrifugal force and the force of the pressure-side behind-vane pressure pDH presses the vane ends against the cam ring. Starting at a point in time t3, the rotational speed n is so high that the centrifugal forces alone suffice to press the vane ends securely against the cam ring.

The pressure control valve 418 is completely opened in this case, whereby the pressure-side behind-vane pressure duct 411 is connected to a non-pressurized region 419, so that the pressure-side behind-vane pressure pDH corresponds to the ambient pressure, i.e., is practically non-pressurized. The throttle valves 413 and 414 are completely opened in this case, whereby the suction-side behind-vane pressure duct 412 is also connected to the non-pressurized region 419 and the pressure-side behind-vane pressure pSH is also non-pressurized. The shut-off valve 421 is closed at the point in time t3, in order to prevent a pressurization of the suction-side behind-vane pressure duct 412 by the pump pressure pP. Alternatively, the shut-off valve 421 can also be designed as a pressure control valve.

Figure 8:
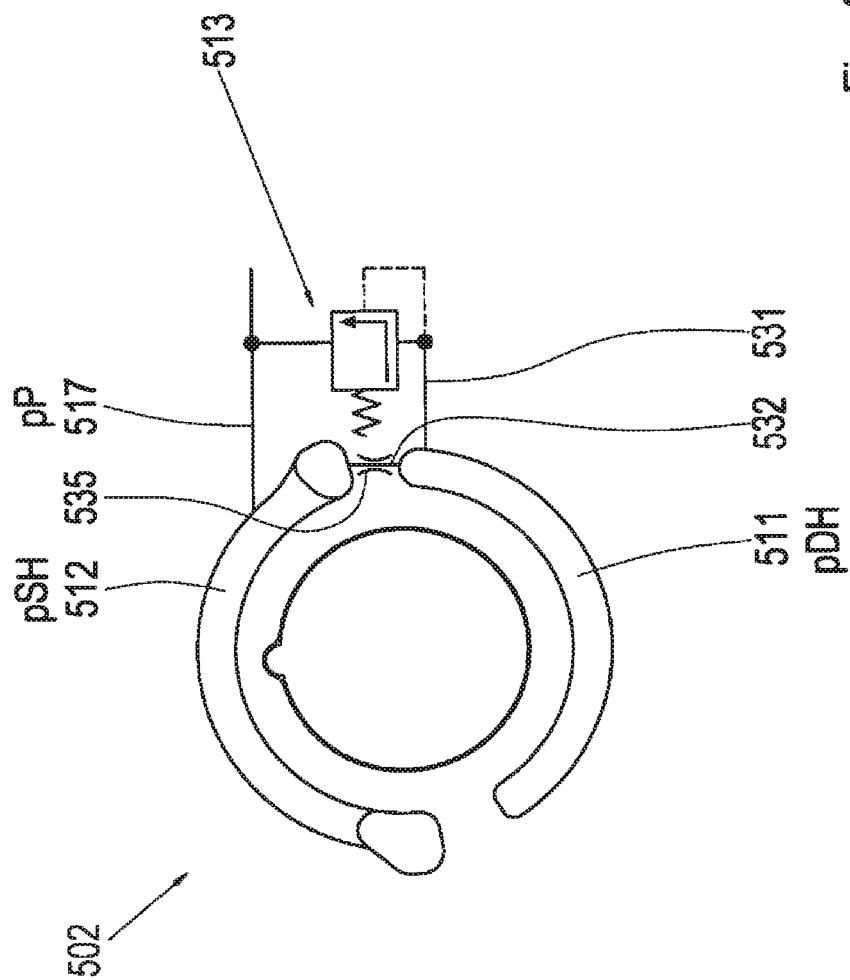
FIG. 8 shows an enlarged section of the pressure plate of a vane pump according to the invention in a fifth example embodiment.

FIG. 8 shows an enlarged section of a diagrammatic axial view of a pressure plate 502 of a vane pump 501 according to example aspects of the invention. A pressure-side behind-vane pressure duct 511 and a suction-side behind-vane pressure duct 512, which are hydraulically connected to each other via a line 532, are formed in the pressure plate 502. In parallel thereto, the pressure-side behind-vane pressure duct 511 is connected, via a line 531 and a pressure limiting valve 513 arranged therein, to a pressure line 517, via which the suction-side behind-vane pressure duct 512 is pressurized by the pressure pP, generated by the vane pump, from the pressure port (not represented) or a point of the pressure side of the vane pump. As a result, in the suction-side behind-vane pressure duct 512, a suction-side behind-vane pressure pSH sets in, which essentially corresponds to the pressure generated by the vane pump, which may be slightly reduced by possible flow losses.

A line can be understood to mean any geometric configuration in which a liquid can be conducted from one point to another point. A line can be designed as a pipe line, a recess such as an indentation in the material of the pressure plate, as a bore hole or an arrangement of multiple bore holes, as a duct configured via casting, or as a combination of the aforementioned possibilities of a line.

The pressure limiting valve 513 is arranged in such a way, in this case, that flow therethrough can take place from the pressure-side behind-vane pressure duct 511 toward the pressure line 517 when the pressure-side behind-vane pressure pDH in the pressure-side behind-vane pressure duct 511 exceeds a certain value. As an alternative to the pressure limiting valve 513, a check valve can also be arranged at this point, wherein the check valve has the same pass-through direction as the pressure limiting valve 513.

The line 532 has a certain hydraulic resistance. This hydraulic resistance can be designed in the form of an orifice or, as represented in the exemplary embodiment, a restrictor 535. If, during the operation of the vane pump, the rotational speed now increases or if the viscosity of the operating medium increases at low temperatures, the pressure-side behind-vane pressure pDH excessively increases. At a maximally permissible pressure value, the pressure limiting valve 513 opens to the pressure line 517 and therefore limits the pressure-side behind-vane pressure pDH. The increase of the pressure-side behind-vane pressure pDH during operation is determined, inter alia, by the hydraulic resistance in the line 531. This hydraulic resistance is selected in such a way that, on the one hand, at low rotational speeds, a pressurization of the pressure-side behind-vane pressure duct 511 from the suction-side behind-vane pressure duct 512 is possible; the suction-side behind-vane pressure duct 512 is supplied from the pressure line 517. On the other hand, due to the hydraulic resistance, a certain lower value of the pressure-side behind-vane pressure pDH that is necessary for a good volumetric efficiency of the vane pump is set.

Alternatively, it would also be possible to connect the pressure-side behind-vane pressure duct via the pressure limiting valve to a suction line of the vane pump, so that the pressure limiting valve opens toward a lower pressure level than is the case with the pressure line, whereby the pressure-side behind-vane pressure can be further reduced.

Figure 9:
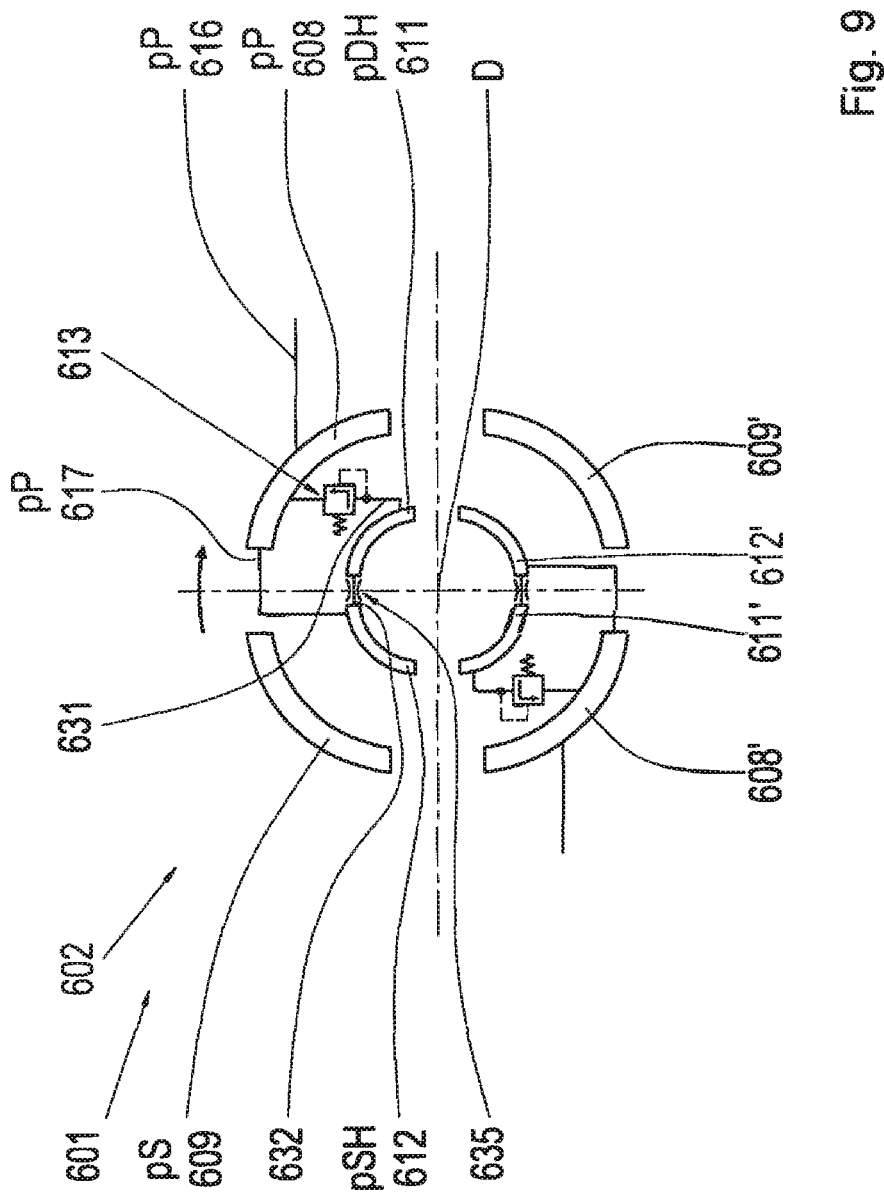
FIG. 9 shows an axial view of a pressure plate of a double-stroke vane pump in a sixth example embodiment according to the invention.

In principle, the embodiments of the approach according to example aspects of the invention can be utilized for a single-stroke vane pump as well as for a multi-stroke vane pump. FIG. 9 shows a diagrammatic axial view of a pressure plate 602 of a double-stroke vane pump 601. The double-stroke vane pump 601 includes two delivery regions as described above. The delivery regions each include a suction region and a pressure region. The suction port 609 and the pressure port 608 as well as a suction-side behind-vane pressure region 611 and a pressure-side behind-vane pressure duct 612 are formed in a first delivery region. The suction port 609' and the pressure port 608' as well as a suction-side behind-vane pressure duct 611' and a pressure-side behind-vane pressure duct 612' are formed in a second delivery region.

The double-stroke vane pump 601 in the exemplary embodiment shown is symmetrically designed, although it can also be asymmetrically designed. In the upper half of the drawing (above the horizontal dash-dotted line), a first self-sufficient delivery region is represented and, in the lower half, a second self-sufficient delivery region is represented. "Self-sufficient delivery regions" is to be understood to mean that, in principle, two pumps are formed within the double-stroke vane pump. The two delivery regions do not affect each other. With the exception of leakage flows, the oil circuits of the two delivery regions are separated. The pressures generated by the two delivery regions can have different levels. Likewise, the particular flow rates can differ in the case of an asymmetrical design of the double-stroke vane pump. For the sake of clarity, essentially only the upper half of the pressure plate 602 is described here. The direction of rotation of a rotor (not shown) about an axis of rotation D is the clockwise direction in the drawing, as represented by the direction-of-rotation arrow R.

The suction region encompasses the suction port 609 and a suction-side behind-vane pressure duct 612, which is arranged radially between the suction port 609 and the axis of rotation D. The suction pressure pS prevails in the suction port and the suction-side behind-vane pressure pSH prevails in the suction-side behind-vane pressure duct 612.

A pressure-side behind-vane pressure duct 611, in which the pressure-side behind-vane pressure pDH prevails, is formed radially within the pressure port 608 in which a pump pressure pP prevails. Similarly to the vane pump in FIG. 8, a line 631 extends out of the pressure-side behind-vane pressure duct 611 to the pressure port 608. In the line 631, i.e., between the pressure-side behind-vane pressure duct 611 and the pressure port 608, a pressure limiting valve 613 is arranged, which is designed and arranged in such a way that flow therethrough can take place only from the pressure-side behind-vane pressure duct 611 once a certain value of the pressure-side behind-vane pressure pDH has been exceeded. Alternatively, the pressure limiting valve 613 could also be arranged between the pressure-side behind-vane pressure duct 611 and the pressure line 616 or 617, i.e., every region of the pressure side of the vane pump 601. Theoretically, an arrangement of the pressure limiting valve 613 between the pressure-side behind-vane pressure duct 611 and the suction region of the vane pump 601, such as the suction port 609 or a non-pressurized region of the automatic transmission, would also be possible.

The suction-side behind-vane pressure region 612 is hydraulically connected to the pressure port 608, in the example shown, via a pressure line 617, so that the suction-side behind-vane pressure region is supplied with operating medium, which is under pump pressure pP. The suction-side behind-vane pressure region 612 and the pressure-side behind-vane pressure duct 611 are connected by a hydraulic resistance 635, which is formed in a line 632. The hydraulic resistance can be designed as a restrictor or an orifice, as in the case of the vane pump 501 in FIG. 8, and is selected, in terms of its size, in the manner described with reference to FIG. 8.

In the case of a double- or multi-stroke vane pump, the pressure-side behind-vane pressure ducts could theoretically be hydraulically connected to one another, so that only one pressure limiting valve would be necessary for two or more delivery regions of the vane pump. A hydraulic connection of the suction-side behind-vane pressure ducts would also be possible, which would further simplify the configuration and the manufacture.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 vane pump
2 pressure plate, first axial plate
3 cover plate, second axial plate
4 pump shaft
5 rotor
6 vane
7 cam ring
8 pressure port
9 suction port
10 housing
11 pressure-side behind-vane pressure duct
12 suction-side behind-vane pressure duct
13 throttle point
14 throttle point
16 pressure line, pressure side of the vane pump
17 pressure line
101 vane pump
102 pressure plate, first axial plate 111 pressure-side behind-vane pressure duct
112 suction-side behind-vane pressure duct
113 variable restrictor
114 variable restrictor
116 pressure line, pressure side of the vane pump
117 pressure line
140 electronic transmission control unit
141 pressure sensor
142 speed sensor
143 signal line
144 signal line
145 signal line
202 pressure plate, first axial plate
211 pressure-side behind-vane pressure duct
212 suction-side behind-vane pressure duct
213 pressure limiting valve
214 check valve
217 pressure line
302 pressure plate, first axial plate
311 pressure-side behind-vane pressure duct
312 suction-side behind-vane pressure duct
313 pressure control valve
314 check valve
317 pressure line
340 electronic transmission control unit
341 pressure sensor
343 signal line
344 signal line
401 vane pump
402 pressure plate, first axial plate
411 pressure-side behind-vane pressure duct
412 suction-side behind-vane pressure duct
413 variable restrictor
414 variable restrictor
417 pressure line
418 pressure control valve
419 non-pressurized region, bleeding
421 shut-off valve
440 electronic transmission control unit
441 pressure sensor
442 speed sensor
443 signal line
444 signal line
445 signal line
446 signal line
502 pressure plate, first axial plate
511 pressure-side behind-vane pressure duct
512 suction-side behind-vane pressure duct
513 pressure limiting valve
517 pressure line
531 line
532 line
535 hydraulic resistance, restrictor
601 vane pump
602 pressure plate, first axial plate
608 pressure port
608' pressure port of the second delivery region
609 suction port
609' suction port of the second delivery region
611 pressure-side behind-vane pressure duct
611' pressure-side behind-vane pressure duct
612 suction-side behind-vane pressure duct
612' suction-side behind-vane pressure duct
613 pressure limiting valve
616 pressure line
617 pressure line
631 line
632 line
635 hydraulic resistance, restrictor
D axis of rotation
n rotational speed of the vane pump
pDH pressure-side behind-vane pressure
pSH suction-side behind-vane pressure
pP pump pressure
pS suction pressure
R direction of rotation
T_Öl temperature of the operating medium
t time
t_1 point in time
t_2 point in time
t_3 point in time
t_4 point in time

The invention claimed is:

1. A vane pump (101) for an automatic transmission, comprising:
   a suction-side behind-vane pressure duct (112) connected to a pressure side (116) of the vane pump (101);
   a pressure-side behind-vane pressure duct (111); and
   a valve unit (113, 114, 213, 214, 313, 314, 413, 414) connected to the pressure-side behind-vane pressure duct (111),
   wherein, during the operation of the vane pump (101), a level of a pressure-side behind-vane pressure (pDH) in the pressure-side behind-vane pressure duct (111, 211, 311, 411) is adjustable with the valve unit (113, 114, 213, 214, 313, 314, 413, 414),
   wherein the valve unit (113, 114) is arranged between the pressure-side behind-vane pressure duct (111) and the suction-side behind-vane pressure duct (112),
   wherein the valve unit (113, 114) has a variable hydraulic resistance, and
   wherein the hydraulic resistance of the valve unit (113, 114, 213) is adjustable with an electronic transmission control unit (140).

2. The vane pump of claim 1, wherein the valve unit is an adjustable throttle valve (113, 114) or an adjustable orifice (33, 34).

3. The vane pump of claim 1, wherein the valve unit (113, 114) has a constant hydraulic resistance.

4. The vane pump of claim 3, wherein the valve unit is a pressure limiting valve (213, 513), and the pressure limiting valve (213, 513) is arranged such fluid is flowable through the pressure limiting valve (213, 513) from the pressure-side behind-vane pressure duct (211, 511) to the suction-side behind-vane pressure duct (212, 512).

5. The vane pump of claim 4, wherein:
   the valve unit comprises a hydraulic resistor (535) in addition to the pressure limiting valve (513);
   the pressure-side behind-vane pressure duct (511) is hydraulically connected to the suction-side behind-vane pressure duct (512);
   the hydraulic resistor (535) is formed between the pressure-side behind-vane pressure duct (511) and the suction-side behind-vane pressure duct (512);
   the pressure limiting valve (513) is arranged between the pressure-side behind-vane pressure duct (511) and a region of the pressure side of the vane pump (501) or a region of the suction side of the vane pump (501) or a non-pressurized region of the automatic transmission; and
   the pressure limiting valve (513) is configured such that fluid is flowable through the pressure limiting valve (513) from the pressure-side behind-vane pressure duct (511) and such that the pressure-side behind-vane pressure (pDH) is reducible with the pressure limiting valve (513).

6. The vane pump of claim 5, wherein the hydraulic resistor is a restrictor (535) or an orifice.

7. The vane pump of claim 5, wherein the vane pump (601) is at least two-stroke and comprises at least two pressure-side behind-vane pressure ducts (611, 611') and at least two suction-side behind-vane pressure ducts (612, 612').

8. The vane pump of claim 1, further comprising a sensor unit (141) for detecting the pressure-side behind-vane pressure (pDH).

9. The vane pump of claim 8, wherein the level of the pressure-side behind-vane pressure (pDH) is adjusted with the valve unit depending on operating parameters detected in the electronic transmission control unit (140).

10. The vane pump of claim 9, wherein the detected operating parameters comprise one or both of a temperature (T_Öl) and a rotational speed (n) of the vane pump.

11. A vane pump (101) for an automatic transmission, comprising:
a suction-side behind-vane pressure duct (112) connected to a pressure side (116) of the vane pump (101);
a pressure-side behind-vane pressure duct (111); and
a valve unit (113, 114, 213, 214, 313, 314, 413, 414) connected to the pressure-side behind-vane pressure duct (111),
wherein, during the operation of the vane pump (101), a level of a pressure-side behind-vane pressure (pDH) in the pressure-side behind-vane pressure duct (111, 211, 311, 411) is adjustable with the valve unit (113, 114, 213, 214, 313, 314, 413, 414),
wherein the valve unit (113, 114) is arranged between the pressure-side behind-vane pressure duct (111) and the suction-side behind-vane pressure duct (112),
wherein, at least in a first operating condition, the valve unit (413, 414, 418, 412) is configured for hydraulically disconnecting at least one first behind-vane pressure duct (412) from a pressure region (417) of the pump and for connecting at least one second behind-vane pressure duct (411) to a non-pressurized region (419), and
wherein, in a second operating condition, the valve unit (413, 414, 418, 412) is configured for connecting the at least one first behind-vane pressure duct (412) to the pressure region (417) of the vane pump.

12. A method for operating the vane pump of claim 11, comprising:
detecting at least a rotational speed (n) of the vane pump in an electronic transmission control unit;
during a start of the vane pump, initially increasing the resistance of the valve unit such that the pressure-side behind-vane pressure (pDH) increases above a certain pressure value, wherein the certain pressure value is selected to be sufficiently high in order to press vane ends against a cam ring; and
during an increasing rotational speed (n), reducing the pressure-side behind-vane pressure (pDH) with the valve unit.

13. The method of claim 12, further comprising detecting an operating temperature of the vane pump, in addition to the rotational speed (n) of the vane pump, in the electronic transmission control unit, wherein the resistance of the valve unit is initially increased during the start of the vane pump when the operating temperature is below a certain temperature (T_Öl).

14. A vane pump (101) for an automatic transmission, comprising:
a suction-side behind-vane pressure duct (112) connected to a pressure side (116) of the vane pump (101);
a pressure-side behind-vane pressure duct (111); and
a valve unit (113, 114, 213, 214, 313, 314, 413, 414) connected to the pressure-side behind-vane pressure duct (111),
wherein, during the operation of the vane pump (101), a level of a pressure-side behind-vane pressure (pDH) in the pressure-side behind-vane pressure duct (111, 211, 311, 411) is adjustable with the valve unit (113, 114, 213, 214, 313, 314, 413, 414),
wherein the valve unit (113, 114) is arranged between the pressure-side behind-vane pressure duct (111) and the suction-side behind-vane pressure duct (112), and
wherein the valve unit comprises a pressure control valve (418) for adjusting the pressure-side behind-vane pressure (pDH) and a shut-off valve (421) for disconnecting and connecting the suction-side behind-vane pressure duct (412) to the pressure side (417) of the vane pump, the shut-off valve (421) being a directional valve.

15. A method for operating the vane pump of claim 14, comprising:
detecting at least a rotational speed (n) of the vane pump in an electronic transmission control unit;
during a start of the vane pump, initially increasing the resistance of the valve unit such that the pressure-side behind-vane pressure (pDH) increases above a certain pressure value, wherein the certain pressure value is selected to be sufficiently high in order to press vane ends against a cam ring; and
during an increasing rotational speed (n), reducing the pressure-side behind-vane pressure (pDH) with the valve unit.

16. The method of claim 15, further comprising detecting an operating temperature of the vane pump, in addition to the rotational speed (n) of the vane pump, in the electronic transmission control unit, wherein the resistance of the valve unit is initially increased during the start of the vane pump when the operating temperature is below a certain temperature (T_Öl).

17. An automatic transmission for a motor vehicle, comprising the vane pump of claim 1.

18. The vane pump of claim 2, wherein the valve unit is an automatic, temperature-dependent variable restrictor or orifice, the valve unit configured such that the hydraulic resistance of valve unit is greater at low temperatures than at higher temperatures and such that the pressure-side behind-vane pressure (pDH) is greater at lower temperatures than at higher temperatures.

19. A vane pump (101) for an automatic transmission, comprising:
a suction-side behind-vane pressure duct (112) connected to a pressure side (116) of the vane pump (101);
a pressure-side behind-vane pressure duct (111);
a check valve (214, 314) arranged between the pressure-side behind-vane pressure duct (211, 311) and the suction-side behind-vane pressure duct (212, 312), the check valve (214, 314) configured to restrict a flow direction to only from the suction-side behind-vane pressure duct (212, 312) to the pressure-side behind-vane pressure duct (211, 311); and
a valve unit (113, 114, 213, 214, 313, 314, 413, 414) connected to the pressure-side behind-vane pressure duct (111), wherein, during the operation of the vane pump (101), a level of a pressure-side behind-vane pressure (pDH) in the pressure-side behind-vane pressure duct (111, 211, 311, 411) is adjustable with the valve unit (113, 114, 213, 214, 313, 314, 413, 414), wherein the valve unit (113, 114) is arranged between the pressure-side behind-vane pressure duct (111) and the suction-side behind-vane pressure duct (112), wherein the valve unit (113, 114) has a variable hydraulic resistance, and wherein the valve unit is a pressure limiting valve (213, 513), and the pressure limiting valve (213, 513) is arranged such fluid is flowable through the pressure limiting valve (213, 513) from the pressure-side behind-vane pressure duct (211, 511) to the suction-side behind-vane pressure duct (212, 512).

20. A vane pump (101) for an automatic transmission, comprising:

a suction-side behind-vane pressure duct (112) connected to a pressure side (116) of the vane pump (101);

a pressure-side behind-vane pressure duct (111);

a check valve (214, 314) arranged between the pressure-side behind-vane pressure duct (211, 311) and the suction-side behind-vane pressure duct (212, 312), the check valve (214, 314) configured to restrict a flow direction to only from the suction-side behind-vane pressure duct (212, 312) to the pressure-side behind-vane pressure duct (211, 311); and a valve unit (113, 114, 213, 214, 313, 314, 413, 414) connected to the pressure-side behind-vane pressure duct (111), wherein, during the operation of the vane pump (101), a level of a pressure-side behind-vane pressure (pDH) in the pressure-side behind-vane pressure duct (111, 211, 311, 411) is adjustable with the valve unit (113, 114, 213, 214, 313, 314, 413, 414), wherein the valve unit (113, 114) is arranged between the pressure-side behind-vane pressure duct (111) and the suction-side behind-vane pressure duct (112), wherein the valve unit (113, 114) has a variable hydraulic resistance, and wherein the valve unit is a pressure control valve (313), and the pressure control valve (313) is arranged such that fluid is flowable through the pressure control valve (313) from the pressure-side behind-vane pressure duct (311) to the suction-side behind-vane pressure duct (312).

* * * * *